United States Patent
Kassner et al.

(10) Patent No.: US 9,533,690 B2
(45) Date of Patent: Jan. 3, 2017

(54) METHOD AND DEVICE FOR DISPLAYING VEHICLE PARAMETERS INCLUDING ENERGY SUPPLY AND DISTANCE TRAVELED

(71) Applicant: Volkswagen Aktiengesellschaft, Wolfsburg (DE)

(72) Inventors: Astrid Kassner, Berlin (DE); Manuel Joachim, Braunschweig (DE); Michael Mischke, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 148 days.

(21) Appl. No.: 14/612,567

(22) Filed: Feb. 3, 2015

(65) Prior Publication Data
US 2015/0217782 A1   Aug. 6, 2015

(30) Foreign Application Priority Data
Feb. 3, 2014   (DE) .................. 10 2014 201 863

(51) Int. Cl.
| | |
|---|---|
| *G08B 21/00* | (2006.01) |
| *B60W 50/14* | (2012.01) |
| *B60K 37/06* | (2006.01) |
| *B60L 11/18* | (2006.01) |

(52) U.S. Cl.
CPC ............. *B60W 50/14* (2013.01); *B60K 37/06* (2013.01); *B60L 11/1805* (2013.01); *B60L 11/1861* (2013.01); *B60K 2350/1092* (2013.01); *B60L 2240/12* (2013.01); *B60L 2240/421* (2013.01); *B60L 2240/545* (2013.01); *B60L 2240/547* (2013.01); *B60L 2240/549* (2013.01); *B60L 2250/10* (2013.01); *B60L 2250/16* (2013.01); *B60L 2260/52* (2013.01); *B60L 2260/54* (2013.01); *B60W 2050/146* (2013.01); *B60W 2510/244* (2013.01); *B60W 2720/00* (2013.01); *Y02T 10/642* (2013.01);
(Continued)

(58) Field of Classification Search
CPC ...................................... B60W 50/14
USPC ................ 340/425.5, 438, 439, 455; 701/22
See application file for complete search history.

(56) References Cited

U.S. PATENT DOCUMENTS

| | | |
|---|---|---|
| 2011/0095878 A1 | 4/2011 | Skaff et al. |
| 2011/0320088 A1 | 12/2011 | Eom et al. |
| 2012/0179318 A1 | 7/2012 | Gilman et al. |

(Continued)

FOREIGN PATENT DOCUMENTS

| | | |
|---|---|---|
| DE | 10 2008 014 580 A1 | 9/2009 |
| DE | 10 2010 010 620 A1 | 1/2011 |

(Continued)

*Primary Examiner* — Jeffery Hofsass
(74) *Attorney, Agent, or Firm* — Muncy, Geissler, Olds & Lowe, P.C.

(57) ABSTRACT

A method and a device for displaying vehicle parameters, which comprise at least a first and a second parameter is provided. A value of the first parameter and a value of the second parameter are determined and the value of the first parameter and the value of the second parameter are displayed on a display area. In addition, the value of the first parameter is changed and the change in the value of the first parameter at least in a first portion is converted into a change in the value of the second parameter. A first display element, via which the conversion of the change in the value of the first parameter into the change in the value of the second parameter is depicted graphically, is created on the display area.

14 Claims, 6 Drawing Sheets

(52) U.S. Cl.
CPC .......... *Y02T 10/7005* (2013.01); *Y02T 10/705* (2013.01); *Y02T 10/7044* (2013.01)

(56) References Cited

U.S. PATENT DOCUMENTS

2012/0179420 A1   7/2012  Gilman et al.

FOREIGN PATENT DOCUMENTS

| | | |
|---|---|---|
| DE | 10 2010 038 258 A1 | 5/2011 |
| DE | 10 2011 018 899 A1 | 10/2011 |
| EP | 2 305 508 A1 | 4/2011 |
| EP | 2 489 990 A1 | 8/2012 |

3-Display Unit

4-Determination Unit

5-Battery

6-Control Device

7-Conversion Unit

METHOD AND DEVICE FOR DISPLAYING VEHICLE PARAMETERS INCLUDING ENERGY SUPPLY AND DISTANCE TRAVELED

This nonprovisional application claims priority under 35 U.S.C. §119(a) to German Patent Application No. 10 2014 201 863.3, which was filed in Germany on Feb. 3, 2014, and which is herein incorporated by reference.

BACKGROUND OF THE INVENTION

Field of the Invention

The present invention relates to a method and a device for displaying vehicle parameters, which comprise at least a first and a second parameter. Further, the invention relates to an electric vehicle with a device of this type.

Description of the Background Art

The display of vehicle parameters is usually limited to a separate display for each vehicle parameter. In this regard, the driver is shown the value that a particular parameter has at the current time. Thus, for example, a temperature, a remaining range reachable with the available energy supply, a distance traveled, the energy supply, the driven speed, or revolutions per minute are displayed as specific numbers. In this case, a connection between the different driving parameters is not evident to a driver. In particular in vehicles obtaining their power for driving at least partially from a battery, it is desirable to point out to the driver a connection between the different parameters.

To this end, an integrated range display is described in DE 10 2010 010 620 A1. The display indicates a time at which a return of the motor vehicle to a predefined starting point is no longer possible due to an insufficient energy supply.

DE 10 2011 018 899 A1 describes a method for supporting a driver in evaluating battery-related information of an electrically powered motor vehicle. The energy content of the battery or a range at different times is displayed for this purpose.

SUMMARY OF THE INVENTION

It is therefore an object of the present invention to provide a method and a device by means of which the connection between different vehicle parameters is made clear.

A value of the first parameter and a value of the second parameter are determined in the method of the invention. The value of the first parameter and the value of the second parameter are displayed on a display area. The value of the first parameter is changed. In so doing, the change in the value of the first parameter at least in a first portion is converted into a change in the value of the second parameter. A first display element is created on the display area, by means of which the conversion of the change in the value of the first parameter into the change of the value of the second parameter is depicted graphically.

The display of the value of the first parameter and of the second parameter in this case need not occur via numerically displayed values. For example, the value can also be displayed via the size or length of a graphic element.

Initially it is first made clear to the driver by the first display element that the first parameter is converted into the second parameter in any manner whatsoever. It is immediately evident to the driver that a change in the first parameter has an effect on the second parameter. A first display element in this case is understood to be particularly an individual display element that depicts graphically the conversion of the change in the value of the first parameter into the change in the value of the second parameter. For example, this can occur by means of a simple, but meaningful animation.

In an embodiment of the method of the invention, the size of the first portion is determined. The first display element is created as a first elongated object in a first position on a display area. The conversion of the change in the value of the first parameter into the change in the value of the second parameter is depicted in that the first elongated object is shifted from the first position to a second position, whereby the width of the shift depends on the size of the first portion. Because the width of the shift depends on the size of the first portion, the driver is not just shown that the change in the first parameter is converted to the change in the second parameter. The driver is also shown the extent of the effect the change in the first parameter will have on the change in the second parameter.

In a further embodiment, the first parameter in a second portion depends on other parameters. The size of the second portion is determined. Furthermore, the first display element is created as a first elongated object with a first length on the display area. Depending on the size of the second portion, the first length of the first elongated object is then changed to a second length.

The second portion accordingly shows an effect of the further parameter on the change in the first parameter. Based on a single display element, the driver can therefore understand both the conversion of the change in the first parameter into the change in the second parameter, and also comprehend that other parameters have an effect on the change in the first parameter. In this case, a change in the length of the first display element depicts the impact the other parameters will have with regard to the change in the first parameter.

A marker can be shown. After the shift the first display element is divided by the marker into a first part and a second part, whereby the length of the first part represents the value of the first parameter after the change in the value of the first parameter and the length of the second part, the value of the second parameter after the change in the value of the first parameter. The length of the second part of the first display element makes clear particularly the width or the extent of the shift of the first display element. In addition, the driver can discern more easily that in addition to the shift the length of the first part of the first display element is shortened. An effect of other parameters on the value of the first parameter is thereby easier to discern.

In particular, the value of a third parameter is determined, whereby a change in the value of the third parameter depends on the change in the value of the first parameter, and the value of the third parameter is displayed on the display area.

In a further embodiment, the value of the third parameter can be depicted as a length of a second display element, which is shown adjacent to the first display element as a second elongated object with a first end and a second end on the display area. The change in the value of the third parameter due to a change in the first parameter in the first portion is depicted by a change in the length of the second elongated object at the first end according to the length of the second part of the first display element. The change in the third parameter due to a change in the first parameter in the second portion is presented by a change in the length of the second elongated objects at the second end. This makes it clear to the driver that a change in the value of the first parameter not only has an effect on the second but also on the third parameter, and that in this case the change in the value of the first parameter from both portions affects the value of the third parameter.

For example, the first parameter can be an energy supply, the second parameter can be a distance traveled, and/or the third parameter can be a remaining range. These three parameters are essential parameters, for example, in electric vehicles. By the method of the invention the driver can clearly discern the conversion of energy into distance traveled and the effect thereof on the remaining range. In addition, an effect of other parameters on the change in the energy supply and the effects of the change in the energy supply on the remaining range are graphically depicted to the driver. As a result, the driver is better able to estimate in particular how he should drive in order to convert a high portion of energy into distance traveled.

The method of the invention can then advantageously have the result that the driver competes with himself. Because he is constantly reminded which portion of the energy supply is in fact converted into a traveled distance, the driver can learn over time which driving behavior leads to a traveled distance that is as long as possible with a battery charge. Therefore the driver is encouraged to an energy-saving driving behavior by the method of the invention.

In an embodiment, the first parameter can be an energy supply. The other parameters can be combined into categories and the impact of each category of other parameters on the energy supply is determined. Because the effect of the categories of other parameters on the energy supply is displayed, particularly the effect of the categories of other parameters on the remaining range is made clear to the driver as well. For each category of other parameters, a graphic element is then created on the display area, which shows the effect of the other parameters on the energy supply or on the remaining range. The extent of the effect of each individual category of other parameters on the energy supply or the remaining range is hereby illustrated to the driver.

In particular, the graphic elements for the different categories represent a marker that divides the first display element into a first and a second part. In this case, the graphic elements comprise at least two indicator elements, of which at least one is shown highlighted, particularly colored, whereby the number of indicator elements shown highlighted and/or the type of highlighting, e.g., the color, of the indicator elements indicate/indicates the extent of the effect of the category of the other parameters on the first parameter. Since the third parameter depends on the first parameter, an effect of the category of the other parameters on the third parameter is also indicated in particular. The highlighting is achieved thereby in particular in that the indicator elements are displayed in a specific color. Thus, red indicator elements can indicate a great effect, orange indicator elements a moderate effect, and green indicator elements a minor effect of the category of the other parameters on the first or third parameter.

The other parameters can be divided into three categories, whereby a first category can be a driving mode, a second category can be driving style, and/or a third category can be navigation. In this case, the driving mode category comprises configurations for climate control, drive characteristics, and/or driver assistance systems, the driving style category information on the driver's current driving behavior, and the navigation category information on different routes to a desired destination.

In an embodiment, the three categories each can have settings for the other parameters, which bring about a minor change in the energy supply, a moderate change in the energy supply, and a great change in the energy supply. The second display element is then divided into a first part and a second part, whereby the length of the first part shows the value of the remaining range and the length of the second part shows a value by which the value of the remaining range is increased, when for the three categories the energetically most favorable settings each are set that bring about a minor change in the energy supply and thus can lead to the greatest possible remaining range when auxiliary consumers are used. The value is indicated by which the remaining range is increased, when the driver sets the energetically most favorable setting for auxiliary consumers, selects an ECO mode for driving, and/or takes an energy-saving route. This is particularly advantageous, when a destination to be reached is just outside the range that can be reached with the current energy consumption of the other parameters. The driver can then estimate whether changing his driving behavior is sufficient in order to reach a destination.

The invention furthermore relates to a device for displaying the vehicle parameters, comprising at least a first and a second parameter. The device comprises a determination unit, via which a value of the first parameter and a value of the second parameter can be determined, and a display unit on which the determined values of the first and second parameter can be displayed. Furthermore, the device of the invention comprises a conversion unit via which the value of the first parameter can be changed, whereby the change in the value of the first parameter can be converted into a change in the value of the second parameter, and a control unit, via which the display unit can be controlled such that a display element can be created, via which the conversion of the change in the value of the first parameter into the change in the value of the second parameter can be depicted graphically.

The device of the invention is particularly suitable for implementing the method of the invention and therefore has all of the advantages of the method of the invention.

In particular, the device can have an energy supply unit with an energy supply, whereby the energy supply is the first parameter. Furthermore, the conversion unit can be a motor via which the energy supply can be converted into distance traveled, whereby the distance traveled is the second parameter. A remaining range can be determined by means of the determination unit from the change in the value of the energy supply by conversion of the energy supply into distance traveled, whereby the remaining range is the third parameter and the value of the remaining range can be displayed on the display area.

The invention also relates to an electric vehicle with a device of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
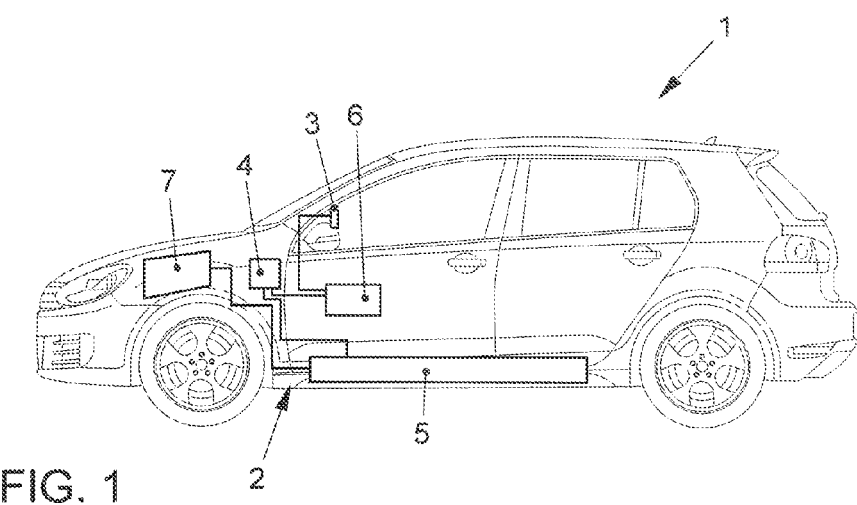
FIG. 1 shows an exemplary embodiment the device of the invention in a vehicle.

An exemplary embodiment of a device 2 of the invention in a vehicle 1 is explained with reference to FIG. 1.

Vehicle 1 in this case is an electric vehicle. Device 2 has an energy supply unit 5 in the form of a battery. The energy used for operating electric vehicle 1 is stored in battery 5.

Furthermore, device 2 comprises a determination unit 4, which is connected to battery 5, a control device 6, and a conversion unit 7.

Determination unit 4 in this case determines the values of a first, second, and third parameter. In this case, the value of the first parameter is an amount of the energy supply available in battery 5. The value of the second parameter is the length of a distance traveled and the value of the third parameter is the length of a remaining range, which can be reached with the energy supply available in battery 5.

Control device 6 in turn is connected to a display unit 3. The values determined for the parameters by determination unit 4 can be transmitted to control device 6 and then presented on display unit 3.

Conversion unit 7 in the present example is the motor of electric vehicle 1. The available energy supply can be changed initially via motor 7. Furthermore, an odometer is attached there by which a distance traveled by electric vehicle 1 can be determined.

Figure 2:
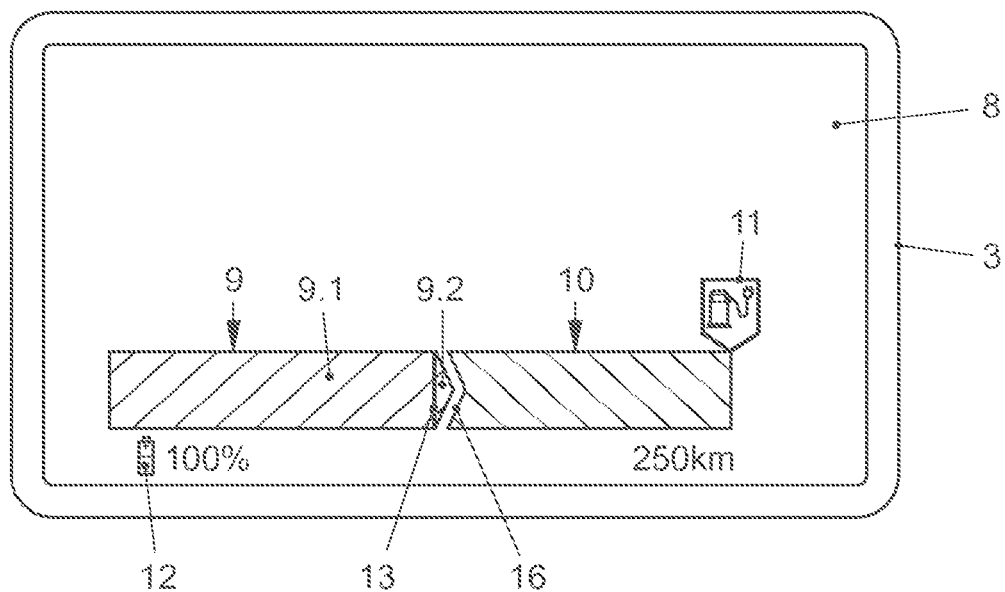
FIG. 2 shows by way of example a display on a display unit of the device of the invention from FIG. 1.

FIG. 2 shows by way of example a display on display area 8 of display unit 3 for a fully charged battery 5. The state of charge is indicated on the left side of display area 8 as 100%. Moreover, a battery icon 12 is shown next to the display of the state of charge to inform the driver that the specification of 100% refers to the state of charge of battery 5. The value of the remaining range is indicated as 250 km on the right side of display area 8. This corresponds to the number of kilometers that can be driven with the current battery charge of 100%. In addition, a gas station icon 11 is displayed to let the driver know that the display of 250 km refers to the remaining range.

In addition, a first display element 9 is shown. First display element 9 is configured as an elongated object, particularly as a bar. In this case, the right end of bar 9 is formed in the shape of an arrow. First bar 9 shows the conversion of the energy supply to distance traveled.

In addition, first bar 9 is divided by a marker 13 into two parts 9.1 and 9.2. In this case, the length of first part 9.1 shows the current value of the energy supply, in the present example therefore 100%. A distance was not yet traveled with the charge of battery 5. The value of the distance traveled is accordingly 0 km. This is indicated in that second part 9.2 of first bar 9 on the right side of marker 13 has only the head of the arrow.

Furthermore, a second display element 10 is shown. Second display element 10 is also configured as an elongated object, particularly as a bar. The total length of second bar 10 in this case shows the value of the remaining range. In the present example, no energy was used as yet. The remaining range is accordingly still the maximum range of 250 km reachable with a battery charge. Second bar 10 has a left end 16, which is formed complementary to the right end of the arrow-shaped end of first bar 9.

A change in the energy supply can generally be converted to different parameters. Because a vehicle is used for the purpose of traveling, the energy supply should therefore be converted primarily to distance traveled. The longer a trip takes, the more energy will be required.

However, the energy supply is not changed only by a conversion of energy into kilometers driven. Rather, other parameters also play a part in a vehicle's energy consumption. These parameters are determined by the driving behavior of the driver. The driving behavior of the driver in this case can be divided particularly into three categories. The first category is determined by driving mode, which in turn comprises different configurations for climate control, drive characteristics, and/or driver assistance systems. The second category is determined by the driver's driving style, which in turn can be proactive, short-sighted, or a mixture of both. The driving style can be influenced particularly with support of driver assistance systems that promote a proactive driving style. The third category comprises navigation. This means that the energy consumption depends on the distance traveled. The energy consumption on a route with a very variable elevation profile or many curves is much greater than on a flat route with few curves.

A first exemplary embodiment of the method of the invention will be explained with reference to FIGS. 3a, 3b, 3c, and 4. In this case, only the section of display area 8 in which first bar 9 and second bar 10 are located will be explained.

The starting situation is the same as described with reference to FIG. 2. The initial display is shown in detail in FIG. 3a:

In step 31, first the value of the energy supply, the value of the distance traveled, and the value of the remaining range that can be reached with the available energy supply are determined. In the present case, battery 5 has been recharged to a charged state of 100%. Determination unit 4 therefore determines a value of the energy supply of 100%, a value of the distance traveled of 0 km, and a value for the remaining range of 250 km, which corresponds to the maximum range reachable with a full battery 5.

Figure 3A:
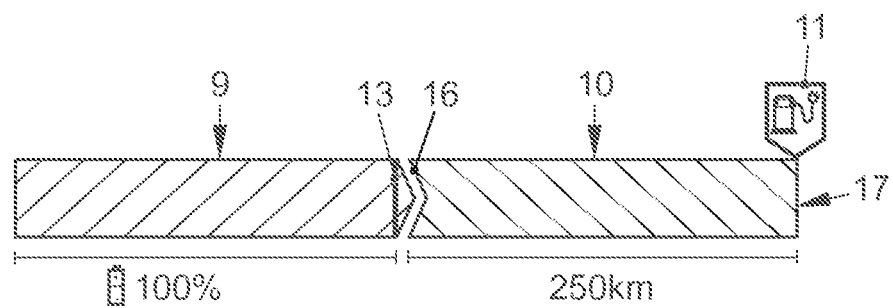
FIGS. 3a, 3b and 3c show displays on the display unit for a first exemplary embodiment of the method of the invention.
Figure 3B:
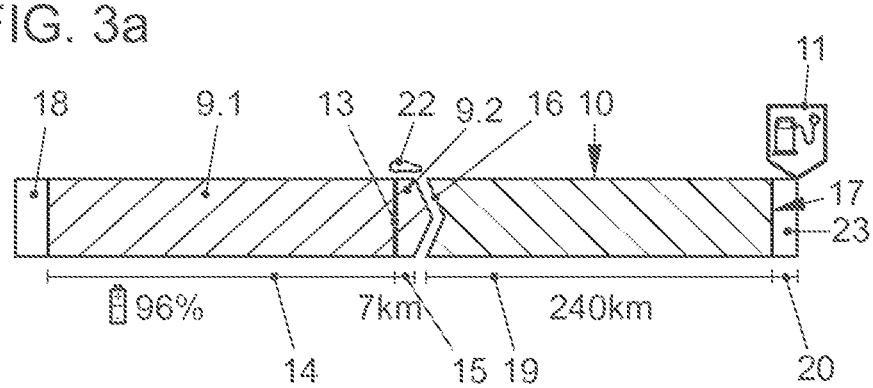

In step 32, thereupon a display, as it is shown in FIG. 3a, is created on display area 8 of display unit 3. This display corresponds to the display already explained with reference to FIG. 2.

In step 33, the driver starts motor 7 of electric vehicle 1 and steps on the gas pedal with his foot. The energy supply is changed as a result. Electric vehicle 1 then begins to move and travels a distance.

It is determined in step 34 how great the first portion of the change in the energy supply is that is converted into traveled distance. This first portion is, for example, 70%. After a change in the energy supply by 4%, electric vehicle 1 at a 100% conversion of energy into distance traveled at a maximum range of 250 km would have had to travel a distance of 10 km. However, only 2.8% of the 4% change is converted to distance traveled. In reality, electric vehicle 1 therefore covered a distance of only 7 km.

It is determined in step 35 how great the second portion of the change in the energy supply is due to other parameters. This goes along with the determination of the first portion, however, so that in the first exemplary embodiment of the method of the invention, the second portion can be determined purely by computation. Therefore if the first portion is 70%, the second portion has to be 30%.

To illustrate this situation, in step 36 display area 8 is controlled such that first bar 9, located in a first position, after a 4% change in the energy supply is shifted from the first position to a second position. Marker 13 remains stationary in this case. Second part 9.2 of first bar 9 is lengthened thereby. Here length 15 of second part 9.2 of first bar 9 represents the length of the distance traveled, in the present example therefore 7 km, and simultaneously the width of the shift of first bar 9.

Length 14 of first part 9.1 of first bar 9 is determined by the two portions of the change in the energy supply. First part 9.1 is therefore first shortened by the width of the shift of the entire first bar 9. In addition, first part 9.1 of first bar 9 is shown shortened by a change in the energy supply due to other parameters. In order to show the driver the entire change in the value of the energy supply, a field 18 is displayed whose length corresponds to the value of the total change in the energy supply. Said field 18 extends from the original left end of first bar 9 to the current left end of first bar 9.

Furthermore, a symbol 22 is indicated, which resembles a vehicle, namely, above second part 9.2 of the first bar. This symbolizes to the driver that second part 9.2 of the first bar shows a distance traveled.

In step 37, to be preferably carried out simultaneously with step 36, second bar 10 on display area 8 is changed. First side 16, which faces second part 9.1 of first bar 9, is shortened corresponding to the width of the shift of first bar 9, therefore corresponding to the length of second part 9.2 of first bar 9. It is clearly illustrated to the driver in this case that the distance traveled is subtracted directly from the remaining range. On side 17, facing away from first bar 9, of second bar 10, second bar 10 is shortened by the second portion of the change in the value of the energy supply. In order to make this clear to the driver, a field 23 is shown, depicting the shortening of length 19 of second bar 10 by the second portion of the change in the value of the energy supply in a different color than second bar 10. The new length 19 of second bar 10 shows the current remaining range of 240 km. Charge icon 11 is also indicated at second end 17 of second bar 10 in order to make it clear to the driver that he should recharge the battery at that time at the latest.

After step 37, the method of the invention 30 begins again. The method of the invention 30 is a method which is repeated constantly. The energy supply, distance traveled, and the remaining range are constantly changed by the process of vehicle operation. Both bars 9 and 10 are changed accordingly in an ongoing animation. First bar 9 shifts continuously here due to each kilometer driven. The remaining range also changes continuously in keeping with the distance traveled, necessitating a constant adjustment of second bar 10. The same applies to the change in the value of the energy supply by the second portion, which is determined by other parameters.

Figure 3C:
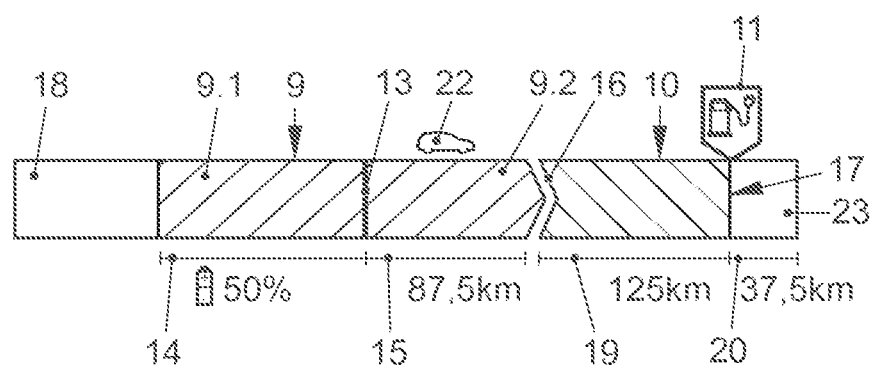
Figure 4:
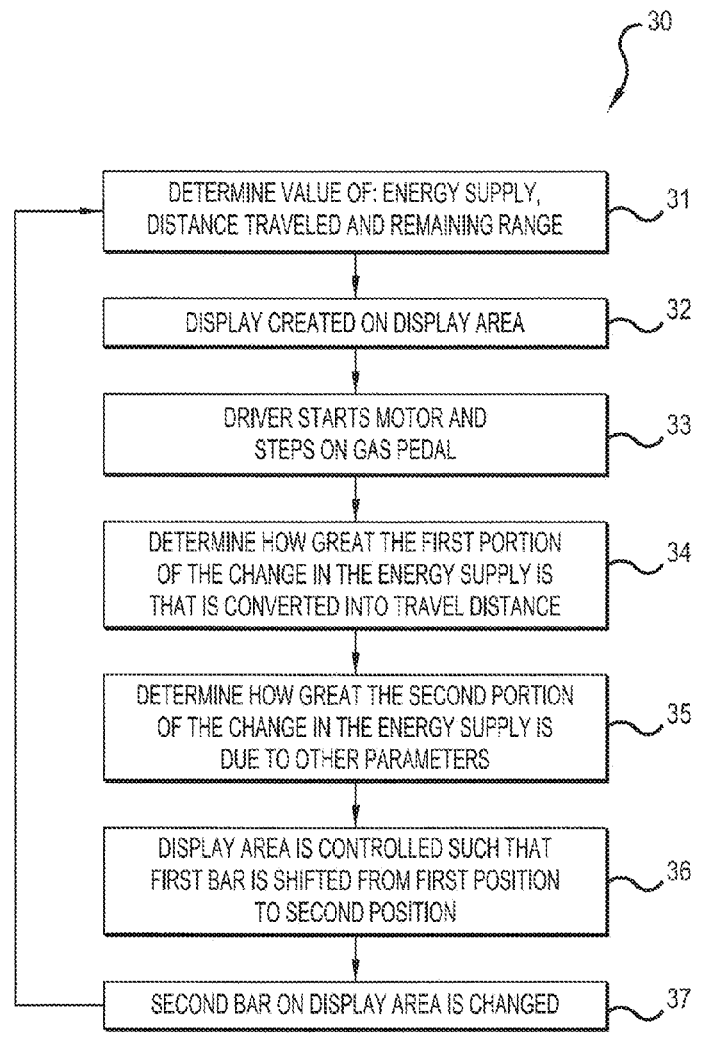
FIG. 4 shows a flowchart for the first exemplary embodiment of the method of the invention.

In FIG. 3*c*, by way of example, a situation is presented in which the overall energy supply has already declined by 50%. In this case, 70% was converted into distance traveled corresponding to a number of 87.5 kilometers. Corresponding to the 50% decline in the energy supply, the remaining range is also indicated by length 19 of the second bar as only 125 km. The missing 37.5 km of the remaining range, which is indicated by length 20 of field 23, were lost due to the energy consumption by other parameters.

The shown figures are snapshot views. The values of the energy supply and the distance traveled are determined continuously. The value of the remaining range is therefore also determined continuously from the value of the state of charge. The shift of bars 9 and 10 is therefore illustrated by an animation, in which lengths 14 and 19 of bars 9 and 10 change constantly. Likewise, the first and second portions of change in the value of the energy supply are also not values established for the duration of the drive. These depend greatly on the driving style and on the employed auxiliary consumers.

A second exemplary embodiment of the method of the invention is explained with reference to FIGS. 5*a*, 5*b*, and 6. In this case, in particular the other parameters in the method are considered in detail.

Step 41 corresponds here to step 31 of method 30. The starting point therefore is again a fully charged battery 5 with a value for the energy supply of 100%, a value for distance traveled of 0 km, and a maximum range of 250 km.

In step 42 of method 40, the effect of each individual category on the change in the energy supply is determined. In this regard, the settings for the individual categories set at the beginning of method 40 are used.

Figure 5A:
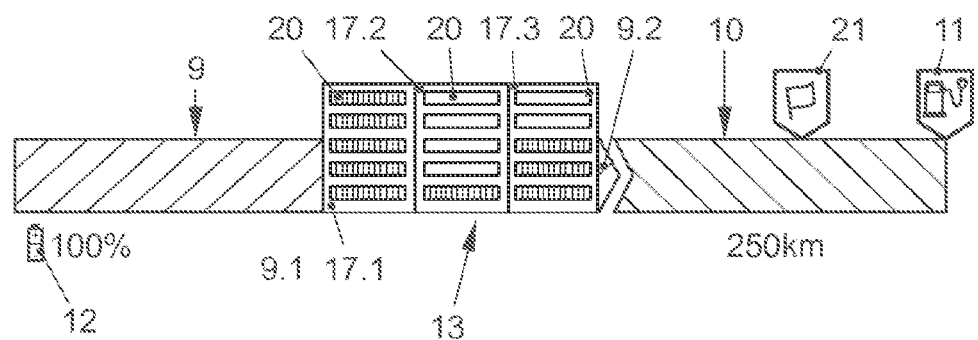
FIGS. 5a and 5b show displays on the display unit for an exemplary embodiment of the method of the invention.
Figure 6:
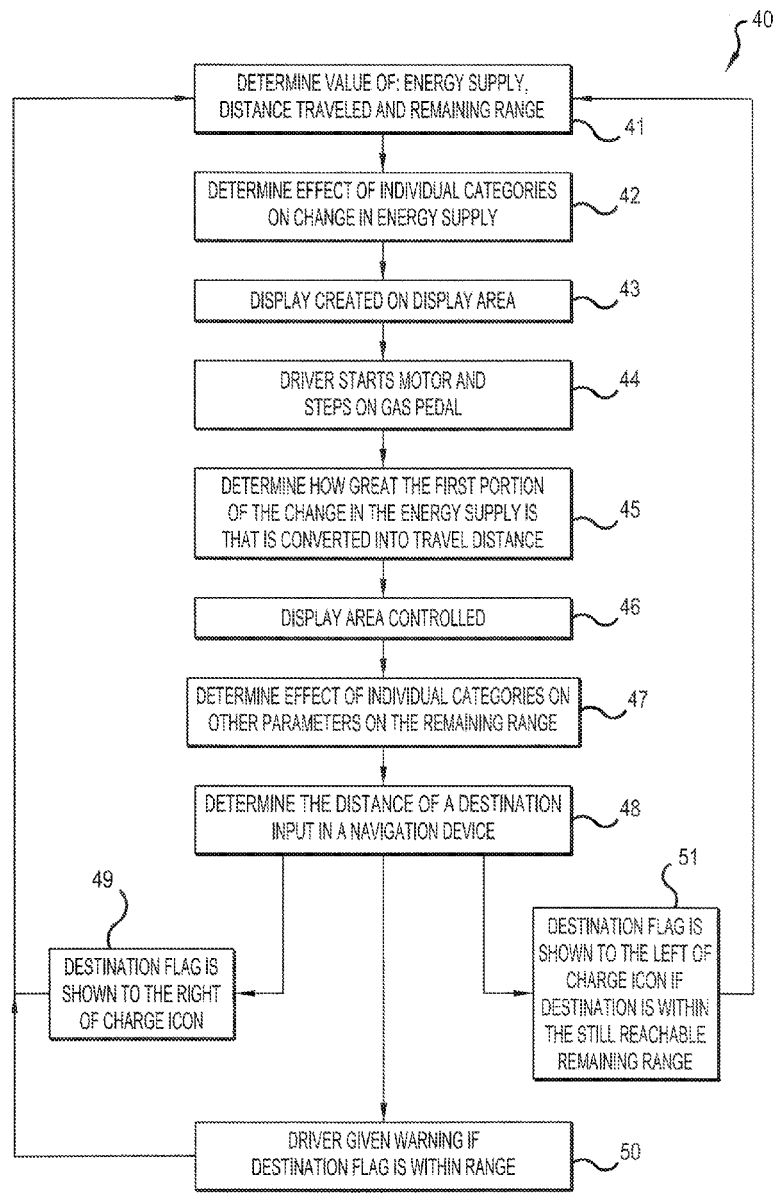
FIG. 6 shows a flowchart for the exemplary embodiment of the method of the invention.

In step 43, a display is created on display area 8, as it is shown in FIG. 5*a*. Graphic elements 17.1 to 17.3 are created on display area 8 in addition to the two display elements 9 and 10. Graphic element 17.1 represents here the category driving mode, graphic element 17.2 the category driving style, and graphic element 17.3 the category navigation.

Here graphic elements 17.1 to 17.3 replace marker 13 of method 30. Marker 13 now has an expanse extending over graphic elements 17.1 to 17.3. Second part 9.2 of first bar 9 is shown at the beginning of method 40 as an arrow tip next to graphic elements 17.3.

Graphic elements 17.1 to 17.3 have indicator elements 20 showing the extent the category has on the energy supply. This is achieved particularly by a coloring of indicator elements 20. In the present example, each graphic element 17.1 to 17.3 has five indicator elements 20. In first graphic element 17.1 representing the category driving mode, five indicator elements 20 are colored. This indicates a high energy consumption by the category driving mode. The driver is provided with the information that, if he would like to reduce the energy consumption and thus increase the remaining range, he should check the settings for the driving mode category. Second graphic element 17.2 only has a colored indicator element 20. The category driving style requires little energy. A change in the driving style would therefore not help the driver in saving energy and thus in increasing the remaining range. Third graphic element 17.3 has three colored indicator elements 20. The category navigation has a moderate impact on the change in the energy supply and thus also a minor effect on the remaining range. In order to save energy and to increase the remaining range a change in the route may be considered.

Step 44 corresponds to step 33 of method 30. The energy supply is changed.

In step 45, as in step 34 of method 30, it is determined how large the first portion is that follows from the change in the energy supply in the conversion of the change in the distance traveled. As in method 30, the first portion was determined as 70% and the second portion as 30%.

Figure 5B:
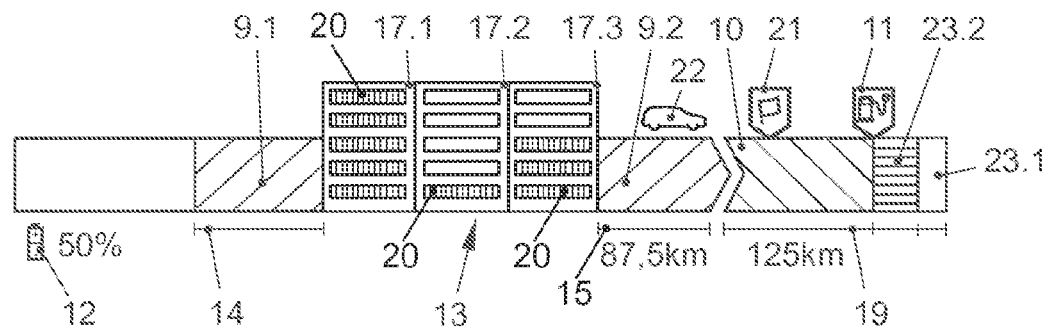

In step 46, display area 8 is now controlled such that a display as is shown in FIG. 5b results. The display is only a snapshot, since the method causes a constant change in the display.

After a total decline in the energy supply by 50%, 35% of the 50% decline in energy is converted into distance traveled and 15% of the 50% decline in energy was converted by other parameters divided into three categories. First bar 9 is shifted such that length 15 of second part 9.2 now represents the value 87.5 km.

Length 14 of first part 9.1 of first bar 9 is accordingly shortened such that first bar 9 is only half as long as with the initial 100% charge of battery 5. The expansion of graphic elements 17.1 to 17.3 representing marker 13, brings about that the animation of the shift has the appearance as if first bar 9 would move past behind graphic elements 17.1 to 17.3.

In step 47, the effect of each individual category of other parameters on the remaining range is determined. Second bar 10 is divided into a first part 10.1 and a second part 10.2. In this case, the length of second part 10.2 indicates the value by which the remaining range would increase, if the driver would use the lowest energy settings in all three categories. This is usually also called a potential. The length of field 23 again shows the value by which the remaining range is irreversibly shortened by the energy consumption of the other parameters.

In step 48, the distance of a destination input in a navigation device is then determined. Depending on the determined distance, the method then continues with step 49, 50, or 51.

If the destination is no longer within the range, in step 49 a destination flag 21 is shown to the right of charge icon 11, but within the area of second part 10.2 of second bar 10. This means that the destination can be reached with a change in the driving behavior, i.e., a change in the settings of the other parameters in the three categories. The driver is shown specific recommendations for reducing the energy consumption. For example, it is suggested to the driver to reduce a fan speed or to drive electric vehicle 1 in an energy-saving ECO mode.

However, if destination flag 21 is within range 23, the driver is given a warning in step 50. This tells the driver that the destination can no longer be reached without charging battery 5.

If the destination is within the still reachable remaining range, destination flag 21 in step 51 is shown to the left of charge icon 11, as shown in FIG. 5b. No suggestions are given.

After steps 49, 50, or 51, method 40 is started from the beginning.

FIGS. 5a and 5b also show snapshots which by way of example show the display on the display area at an energy supply of 100% or 50%.

Alternatively, indicator elements 20 can also stand for different configurations of the categories. For the driving style, for example, this means preset configurations for the climate control system and/or volume for the radio. These can be configured and saved, for example, by the driver himself. Thus, indicator elements 20 within a category can then have a different color, whereby then a green color indicates "low-energy," an orange color "moderate," and a red color "energy-intensive." The driver can then select the configuration he desires using a control element, whereby the set configuration is then displayed by indicator element 20, which is arranged on the lowest position of the particular graphic element 17.1 to 17.3. Thus, the driver is constantly reminded that by changing the configuration he could save energy and thus increase the remaining range. This also applies to driving style and navigation.

In case the driver has made no entries in a navigation device, graphic element 17.3, which represents navigation, is shown grayed out, i.e., inactive. Alternatively, only two graphic elements 17.1 and 17.2 can then be shown.

The different steps of methods 30 and 40 can easily be varied and combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for displaying vehicle parameters, which comprise at least a first and a second parameter, the method comprising:
   determining a value of the first parameter and a value of the second parameter;
   displaying the value of the first parameter and the value of the second parameter on a display area;
   converting a change in the value of the first parameter at least in a first portion to a change into the value of the second parameter when the value of the first parameter is changed; and
   creating a first display element on the display area, via which the conversion of the change in the value of the first parameter into the change in the value of the second parameter is depicted graphically.

2. The method according to claim 1, wherein a size of the value of the first portion is determined, wherein the first display element is created as a first elongated object in a first position on the display area, wherein the conversion of the change in the value of the first parameter into the change in the value of the second parameter is depicted in that the first elongated object is shifted from a first position to a second position, and wherein a width of the shift depends on the size of the first portion.

3. The method according to claim 1, wherein the change in the first parameter in a second portion depends on other parameters, wherein the size of the second portion is determined, wherein the first display element is created as a first elongated object with a first length on the display area, and wherein, depending on the size of the second portion, the first length of the first elongated object is changed to a second length.

4. The method according to claim 2, wherein a marker is shown, and wherein after the shift the first display element is divided by the marker into a first part and a second part, wherein a length of the first part represents the value of the first parameter after the change in the value of the first parameter and a length of the second part represents the value of the second parameter after the change in the value of the first parameter.

5. The method according to claim 1, wherein the value of a third parameter is determined, wherein a change in the value of the third parameter depends on the change in the value of the first parameter, and the value of the third parameter is displayed on the display area.

6. The method according to claim 5, wherein the value of the third parameter is depicted as a length of a second display element, which is shown adjacent to the first display element as a second elongated object with a first end and a second end on the display area, wherein the change in the value of the third parameter due to a change in the first parameter in the first portion is depicted by a change in the length of the second elongated object at the first end according to the length of the second part of the first display element, and wherein the change in the value of the third parameter due to a change in the first parameter in the second portion is depicted by a change in the length of the second elongated object at the second end.

7. The method according to claim, 5 wherein the first parameter is an energy supply, the second parameter is a distance traveled, and the third parameter is a remaining range.

8. The method according to claim 3, wherein the first parameter is an energy supply, the other parameters are combined into categories, the effect of each category of other parameters on the energy supply is determined, and for each category of other parameters, a graphic element is created on the display area, which shows the effect of the other parameters on the energy supply.

9. The method according to claim 8, wherein the graphic elements for the different categories represent the marker, which divides the first display element into the first part and the second part, wherein the graphic elements comprise at least two indicator elements, of which at least one is shown highlighted, wherein the number of the highlighted indicator elements and/or the type of highlighting of the indicator elements indicate/indicates the extent of the effect of the category of the other parameters on the first parameter.

10. The method according to claim 7, wherein the other parameters are divided into three categories, wherein a first category is a driving mode, a second category is a driving style, and/or a third category is navigation, wherein the driving mode category comprises configurations for climate control, drive characteristics, and/or driver assistance systems, wherein the driving style category comprises information on the driver's driving behavior, and wherein the navigation category comprises information on different routes to a desired destination.

11. The method according to claim 10, wherein the three categories each have settings for the other parameters that bring about a minor change in the energy supply, a moderate change in the energy supply, or a great change in the energy supply, and wherein the second display element is divided into a first part and a second part, wherein the length of the first part shows the value of the remaining range and the length of the second part shows a value by which the value of the remaining range is increased, when the settings for the three categories are set that bring about a minor change in the energy supply.

12. A device for displaying vehicle parameters, which comprise at least a first and a second parameter, the device comprising:
    a determination unit via which a value of the first parameter and a value of the second parameter is determined;
    a display unit with a display area on which the determined values of the first parameter and of the second parameter are displayed;
    a conversion unit, via which the value of the first parameter is changed, a change in the value of the first parameter being converted into a change in the value of the second parameter; and
    a control unit via which the display unit is controlled such that a first display element is created via which the conversion of the change in the value of the first parameter into the change in the value of the second parameter is depicted graphically.

13. The device according to claim 12, wherein the device has an energy supply unit with an energy supply, the energy supply being the first parameter, wherein the conversion unit is a motor via which the energy supply is converted into distance traveled, the distance traveled being the second parameter, wherein a remaining range is determined via the determination unit from the change in the value of the energy supply by conversion of the energy supply into distance traveled, and wherein the remaining range is the third parameter and the value of the remaining range is displayed on the display area.

14. An electric vehicle comprising a device according to claim 12.

* * * * *